(12) United States Patent
Schwabe et al.

(10) Patent No.: US 7,987,297 B2
(45) Date of Patent: Jul. 26, 2011

(54) ELECTRICAL FIELD DEVICE AND METHOD FOR ESTABLISHING A DATA LINK BETWEEN A DATA INTERFACE OF THE ELECTRICAL FIELD DEVICE AND A DATA MEMORY INSIDE THE DEVICE

(75) Inventors: Stefan Schwabe, München (DE); Stefan Walz, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 280 days.

(21) Appl. No.: 12/158,093

(22) PCT Filed: Dec. 19, 2005

(86) PCT No.: PCT/DE2005/002308
§ 371 (c)(1),
(2), (4) Date: Jun. 19, 2008

(87) PCT Pub. No.: WO2007/071211
PCT Pub. Date: Jun. 28, 2007

(65) Prior Publication Data
US 2009/0222594 A1 Sep. 3, 2009

(51) Int. Cl.
*G06F 3/00* (2006.01)
(52) U.S. Cl. .................. 710/15; 710/14; 714/42

(58) Field of Classification Search ............ 710/14, 710/15
See application file for complete search history.

(56) References Cited

U.S. PATENT DOCUMENTS

| 6,098,155 | A  * | 8/2000 | Chong, Jr. .............. 711/138 |
| 6,754,607 | B2 * | 6/2004 | Tanabe .................. 702/130 |
| 2006/0036897 | A1 * | 2/2006 | Lin et al. ................. 714/5 |
| 2008/0024163 | A1 * | 1/2008 | Marui ..................... 326/39 |
| 2008/0114911 | A1 * | 5/2008 | Schumacher ............. 710/72 |
| 2008/0144375 | A1 * | 6/2008 | Cheng .................. 365/185.05 |

* cited by examiner

*Primary Examiner* — Henry W Tsai
*Assistant Examiner* — Kris Rhu
(74) *Attorney, Agent, or Firm* — Laurence A. Greenberg; Werner H. Stemer; Ralph E. Locher

(57) ABSTRACT

An electrical field device has a microprocessor-controlled control device, a data memory which is inside the device and is connected to the control device via a first memory controller, and a data interface which is connected to the control device and is intended to connect external devices to the electrical field device. In order to ensure access to the data memory inside such a field device even when the control device or internal power supply device is not in working order, the data interface is connected to the data memory inside the device via a second memory controller. There is also disclosed a method for establishing a data link between a data interface of an electrical field device and a data memory inside the device.

4 Claims, 4 Drawing Sheets

ELECTRICAL FIELD DEVICE AND METHOD FOR ESTABLISHING A DATA LINK BETWEEN A DATA INTERFACE OF THE ELECTRICAL FIELD DEVICE AND A DATA MEMORY INSIDE THE DEVICE

BACKGROUND OF THE INVENTION

Field of the Invention

The invention relates to an electrical field device having a microprocessor-controlled control device, a data memory, which is inside the field device and is connected to the control device via a first memory controller, and a data interface which is connected to the control device and is intended for connecting external equipment to the electrical field device. The invention also relates to a method for setting up a data link between the data interface of the electrical field device and the data memory inside the field device.

An electrical field device of this kind is known by way of example from the German utility model with the issue number 20 2004 020 653. The known electrical field device comprises a microprocessor-controlled control device, a data memory inside the field device and a data interface connected to the control device. In the known field device, the data interface can have, in particular, external passive data storage modules, such as a USB stick, connected to it.

Electrical field devices are usually used for picking up measured values in automated processes and for controlling such processes. By way of example, the processes may be chemical or industrial processes, industrial production processes or distribution processes, for example for distributing electrical power in power supply networks. In this context, the electrical field devices are usually arranged close to the respective automated process. In the case of electrical power supply networks, the electrical field devices may be control stations or protective devices, for example. The latter are used to pick up measured values from the power supply network and to check them for compliance with permitted operating ranges. If the measured values are outside of the permitted operating range, countermeasures are automatically prompted by the electrical protective device, such as opening a circuit breaker.

The processes in an electrical field device are usually controlled using microprocessor-controlled control devices, such as an assembly containing a central processing unit (CPU). This accesses the field device's internal memory, in which it can store data and from which it can read an executable program, for example. An executable program of this kind may be what is known as firmware in the field device, for example.

In order to perform all the data processing processes, the microprocessor-controlled control device and the data memory need to be supplied with electrical power, what is known as auxiliary power of the field device. This can be provided by a current source in the electrical field device, for example, such as a battery or—far more commonly—by a power supply unit which is located in the electrical field device and which is connected to an external supply of power. If the supply of power and/or the control device fails, the data which have been stored in the data memory inside the field device can now be read externally only with difficulty.

BRIEF SUMMARY OF THE INVENTION

The object of the invention is to specify an electrical field device and a method for setting up a data link between a data interface in the field device and a data memory inside the field device, wherein data interchange with the data memory inside the field device is possible even when the field device is not fully operational.

The invention achieves this object for the field device by virtue of the data interface being connected to the data memory inside the field device via a second memory controller. This is because this not only allows the control device itself to be used to access the data memory inside the field device, but also allows data interchange via the data interface of the electrical field device, entirely without needing the electrical field device's control device. By way of example, the data interface can have an external computer connected to it which is used to access the data in the data memory inside the field device.

One advantageous embodiment of the field device according to the invention involves the data memory inside the field device and the data interface being connected by means of a power supply line. In this way, if the power supply in the field device fails, the data memory inside the field device can be supplied with the electrical power required for storing or reading data via the data interface.

In line with another advantageous embodiment of the field device according to the invention, a changeover apparatus whose input is connected to the data interface and whose output is connected to the control device and to the second memory controller, and a monitoring device are provided, wherein the monitoring device is designed to monitor a field device internal power supply and/or the control device in the electrical field device for functionality and, if the field device's internal power supply and/or the control device fails, prompts the changeover apparatus to break the link between the data interface and the control device and to set up the link between the data interface and the second memory controller. This particularly advantageously allows automatic changeover of the access path to the data memory inside the field device. If there is a fault in the electrical field device which concerns the control device or the power supply in the field device, so that access to the data memory inside the field device via the electrical field device's control device is no longer possible, the access path is changed over by the monitoring device and the changeover device such that data interchange can then take place between the data memory inside the field device and the data interface without the electrical field device's control device being involved.

Another advantageous embodiment of the electrical field device also provides for the electrical field device to have a removable operator control unit which comprises at least the data memory inside the field device, the data interface and the second memory controller. In this case, the electrical field device is an electrical field device of modular design in which the electrical control device is arranged in a first housing module of the electrical field device and the operator control elements of the electrical field device, such as a display, a keypad and the data interface, are arranged together with the data memory inside the field device and the second memory controller in an operator control module which can be removably connected to the first housing module. This special arrangement of the components in the field device allows access to the field device's data memory even if there is no data link between the housing module with the control device and the operator control unit.

One exemplary embodiment of such a field device of modular design is described in DE 19817945 C1. Such a field device is particularly suitable for installation in a switchgear cabinet, since in this case it is not necessary to install the entire device in the switchgear cabinet door, but rather only the operator control module is mounted on the switchgear cabinet door and a data line is used for data interchange between the operator control module and the first housing module with the control device which is arranged in the switchgear cabinet.

The object stated above is achieved for the cited method by virtue of a monitoring device monitoring the functionality of a control device and/or an internal power supply in the electrical field device; if the control device and/or the internal power supply fails, the monitoring device prompts the data link between the control device and the data memory inside the field device to be broken and a data link between the data interface and the data memory inside the field device to be set up. In this way, data interchange can particularly advantageously take place with the data memory inside the field device externally via the data interface without needing the electrical field device's control device.

It is also considered to be advantageous if the monitoring device uses a changeover switch to prompt the data link between the control device and the data memory inside the field device to be broken and the data link between the data interface and the data memory inside the field device to be set up.

To explain the invention in more detail, some exemplary embodiments are shown merely by way of example in FIGS. 1 to 4, in which

DESCRIPTION OF THE INVENTION

Figure 1:
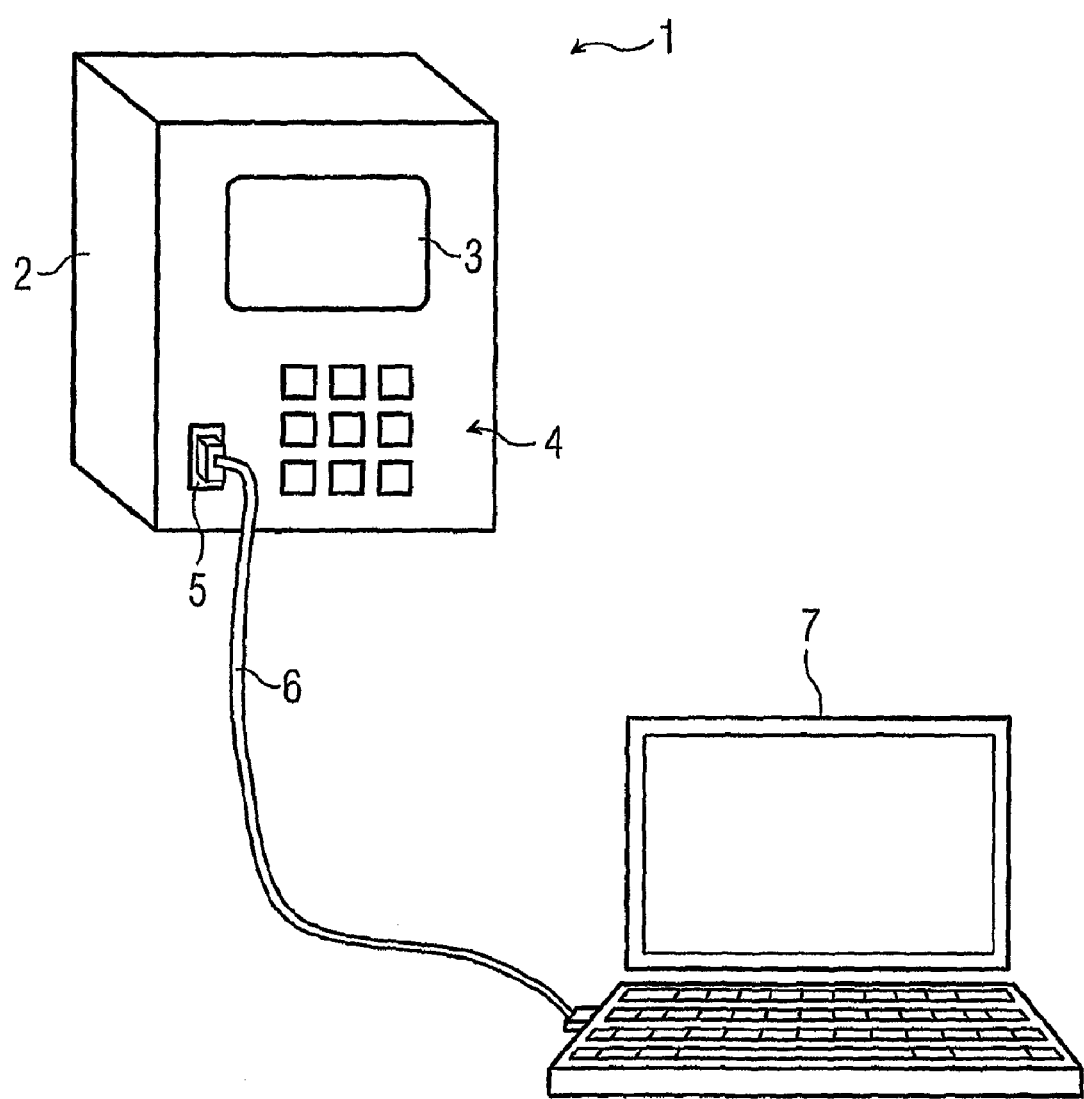
FIG. 1 shows a perspective view of a field device connected to an external computer via a data interface.

FIG. 1 shows an electrical field device 1, which may be an electrical protective device for protecting electrical power supply networks, for example. The electrical field device 1 has a housing 2 whose front has an operator control panel with a display 3, a keypad 4 and a data interface 5. The data interface 5 is used to connect an external data processing device in the form of a laptop 7 to the electrical field device 1 by means of a data transmission line 6. In this context, the field device 1 is designed such that, even if, by way of example, a control device and/or an internal power supply in the electrical field device 1 are not in operation (e.g. on account of a fault), it is possible to carry out data interchange between a data memory inside the field device 1 and the laptop 7 via the data interface 5.

Figure 2:
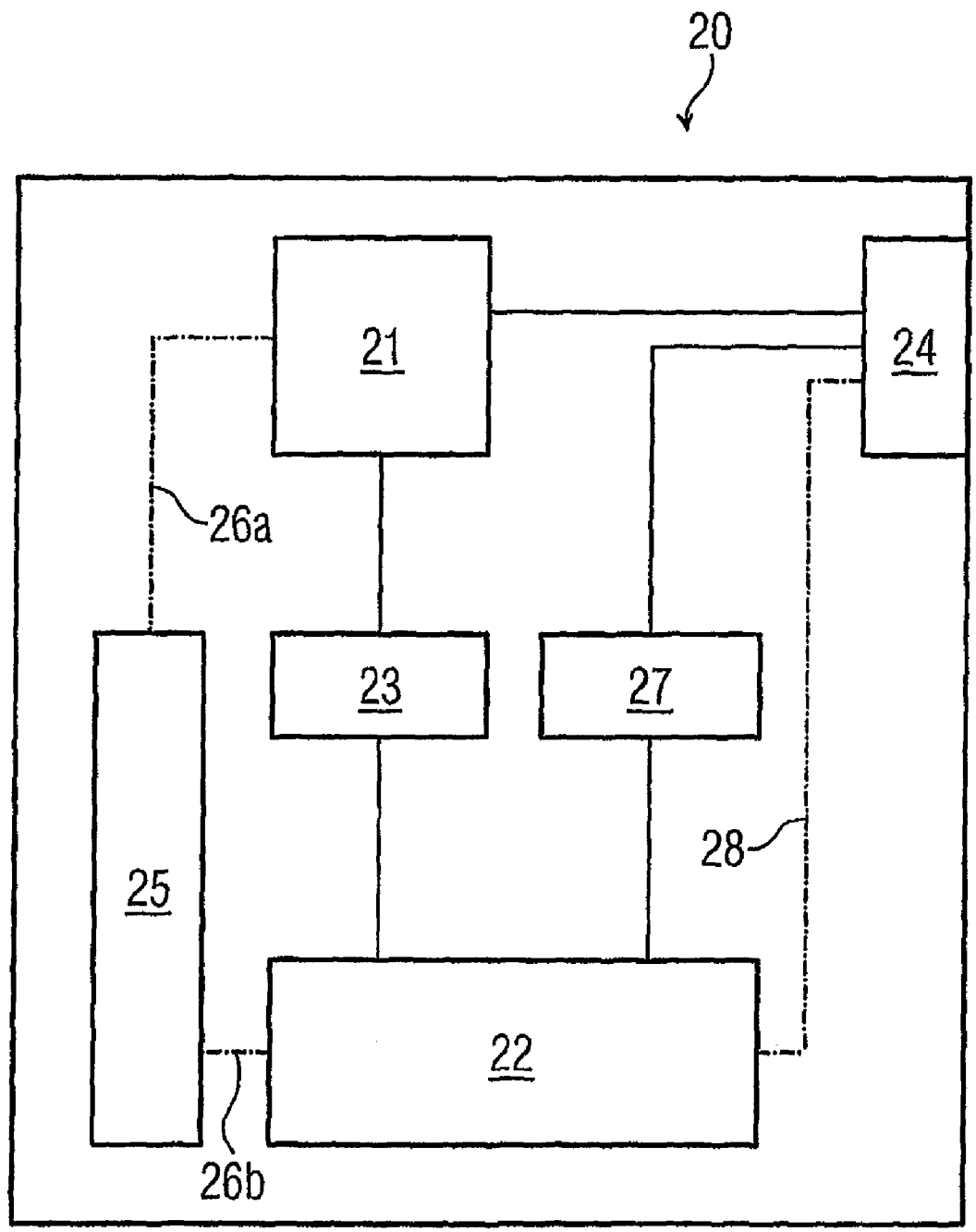
FIG. 2 shows a schematic block diagram of a first exemplary embodiment of an electrical field device.

The internal design of the electrical field device 1 is shown in FIG. 2 by way of example in a first exemplary embodiment. In this case, the illustration is limited to a schematic block diagram. In FIG. 2, an electrical field device 20 has a microprocessor-controlled control device 21, which is used to perform the functions of the electrical field device 20. To stipulate such functions, a piece of software (e.g. the device's firmware) is stored in a data memory 22 inside the field device, for example, and, when executed by means of the control device 21 in the electrical field device 20, performs the desired functions.

The control device 21 accesses the data memory 22 inside the field device via a first memory controller 23. Although FIG. 2 shows the memory controller 23 in the form of a separate module of the electrical field device 20, it is also possible for the functionality implemented by the memory controller 23 to be integrated into the control device 21.

The control device 21 is also connected to a data interface 24 which can be used to connect external equipment to the electrical field device 10.

The electrical power required for controlling the field device's internal processes, particularly of the control device 21 and of the data memory 22 inside the field device, is provided by a power supply device 25, for example a power supply unit in the electrical field device 20. In FIG. 2, the power supply device 25 is connected firstly to the control device 21 and secondly to the data memory 22 inside the field device by means of lines 26a and 26b.

If either the power supply device 25 or the control device 21 in the electrical field device 20 fails, the control device 21 and the first memory controller 23 can no longer be used to access the data memory 22 inside the field device. In order nevertheless to be able to store data in the data memory 22 inside the field device or to read them from it, the data interface 24 is connected to the data memory 22 inside the field device via a second memory controller 27. In this way, the data interface 24 can be used for directly accessing the data memory 22 inside the field device, without this requiring the control device 21 in the electrical field device 20.

If the data memory 22 inside the field device requires electrical power for storing and/or reading data, the data interface 24 is connected to the data memory 22 inside the field device by means of a power supply line 28. Thus, the data memory 22 inside the field device can be provided with the electrical power required for the storage and reading operations via the data interface 24 and the power supply line 28.

In this way, the data memory 22 inside the field device in the electrical field device can be accessed externally without there being any need for the control device or the internal power supply in the electrical field device to be operational. Apart from when one of these two components fails, this may also arise, by way of example, when the electrical field device has not yet been definitively connected and hence, by way of example, there is not yet an external supply of power for the field device's internal power supply 25. By way of example, the electrical field device 20 allows access to the data memory 22 inside the field device, for example in order to perform an update for the firmware or to set parameters, even when it is in its transport packaging. This merely requires the data interface 24 of the electrical field device 20 to be externally accessible.

Figure 3:
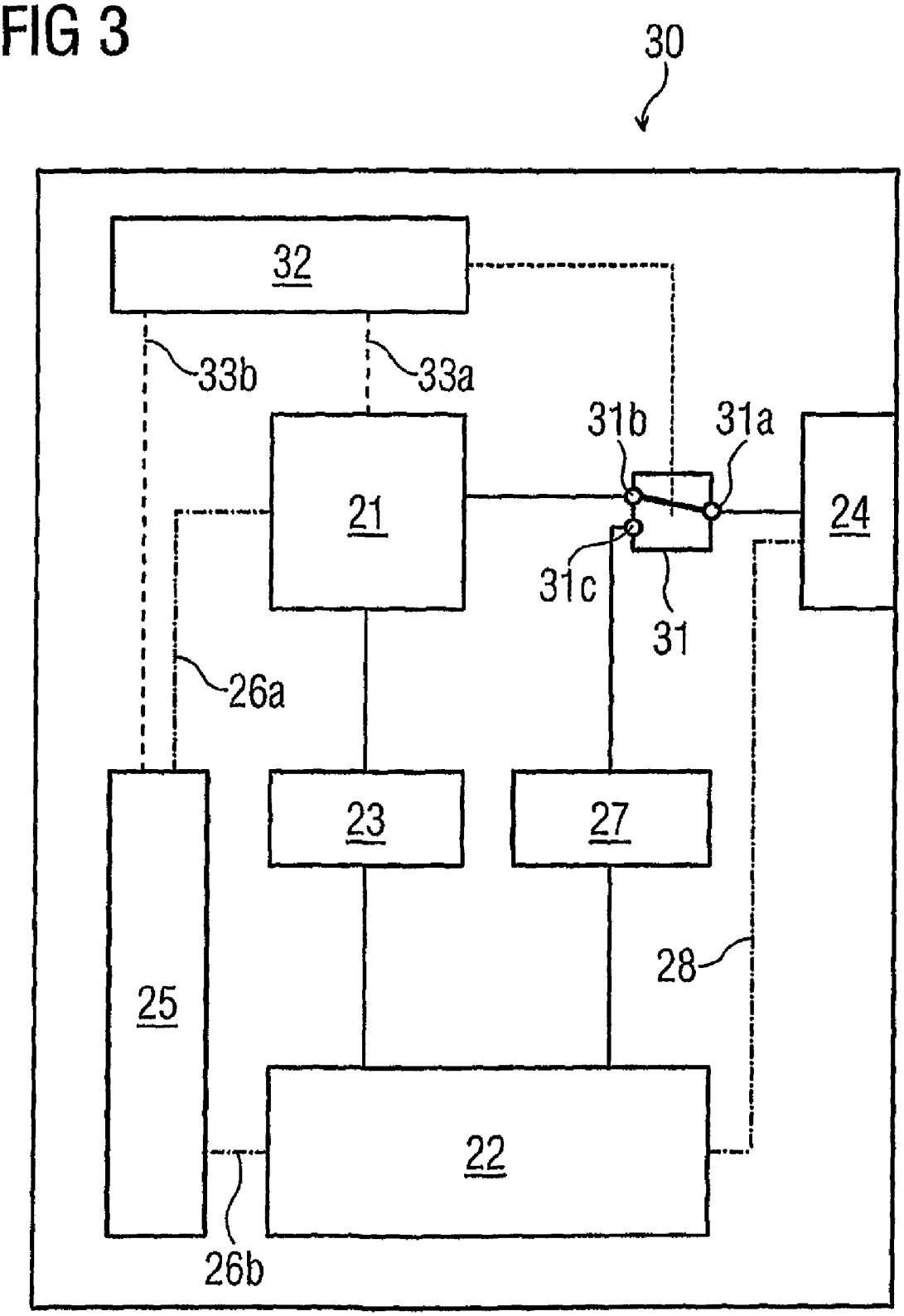
FIG. 3 shows a schematic block diagram of a second exemplary embodiment of an electrical field device.

FIG. 3 shows a second exemplary embodiment of an electrical field device. The fundamental components of the electrical field device 30 shown in FIG. 3 correspond to those of the field device 20 shown in FIG. 2, with identical components being identified by the same reference symbols. Thus, the field device 30 shown in FIG. 3 also has a microprocessor-controlled control device 21, a field device internal power supply 25, a data memory 22 inside the field device, a data interface 24 and also a first memory controller 23 and a second memory controller 27. The field device 30 shown in FIG. 3 differs from the field device 20 shown in FIG. 2 by virtue of a changeover apparatus 31 whose input is connected by means of a first connection 31a to the data interface 24 and whose output is connected firstly by means of a second connection 31b to the control device 21 and secondly by means of a third connection 31c to the second memory controller 27. Internally, the changeover apparatus 32 allows switchable electrical connection either of the connections 31*a* and 31*b* or of the connections 31*a* and 31*c*, so that the data interface 24 is connected either to the control device 21 of the electrical field device 30 or to the second memory controller 27.

The field device 30 shown in FIG. 3 also has a monitoring device 32 which, as indicated by the dashed lines 33*a* and 33*b*, is used to monitor the control device 21 and the internal power supply 25 of the electrical field device 30 for their functionality. Unlike in the illustration shown in FIG. 3, it is also possible to monitor just one of the two components, that is to say either the control device 21 or the power supply 25, or else additional components of the electrical field device 30 (e.g. a data bus or the first memory controller 23), by means of the monitoring device 32. If the monitored components of the electrical field device 30 are functional, the changeover apparatus 31 is actuated by means of the monitoring device 32 such that the data interface 24 is connected to the control device 21. This allows the data interface 24 to be actuated by the control device 21 of the electrical field device 30, for example in order to use the control device 21 to store or read data in or from an external data storage module, such as a USB stick, connected to the electrical field device 30 via the data interface 24. In addition, in this operating position, the data interface 24 can also be used to connect an external data processing device, such as the laptop 7 shown in FIG. 1, to the electrical field device, with all communication by the electrical field device 30 with the external data processing device being controlled by the control device 21.

If at least one of the two monitored components of the electrical field device 30 has failed or is not operational for other reasons, the changeover device 31 is actuated by means of the monitoring device 32 such that the data interface 24 is then connected to the data memory 22 inside the field device via the second memory controller 27. In this position of the changeover apparatus 31, the data interface 24 can be used to access the data memory 22 inside the field device directly, without this requiring the electrical field device's control device 21 to be active.

Since failure of the field device's internal power supply 25 will usually also mean that the monitoring device 32 is without electrical power, either changing over the changeover apparatus 31 requires the monitoring device 32 to be provided with an electrical energy buffer, for example a capacitor, which allows the monitoring device 32 to continue to be supplied with power, even after the field device's internal power supply 25 has failed, for as long as necessary in order to perform a changeover operation on the changeover apparatus 31, or, alternatively, the changeover apparatus 31 may also be in a form such that when it is without power it automatically sets up a link between its connections 31*a* and 31*c*, so that the data interface 24 is always connected to the data memory 22 inside the field device via the second memory controller 27 when there is no power, without the need for the monitoring device 32 to perform an active switching operation.

Although the monitoring device 32 and the changeover apparatus 31 shown in FIG. 3 are shown as separate components, it is also possible for them to be integrated into a single component.

Figure 4:
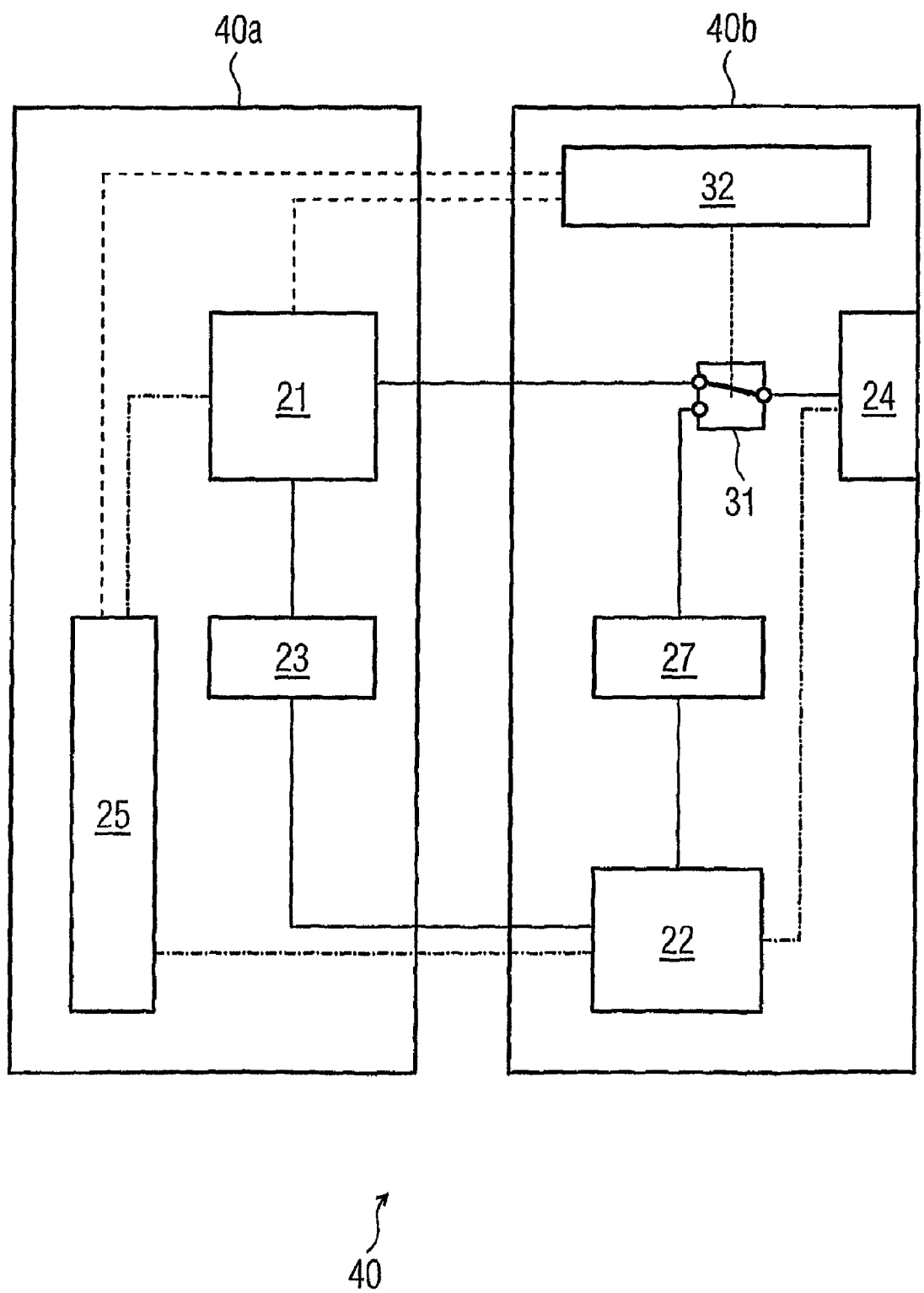
FIG. 4 shows a schematic block diagram of a third exemplary embodiment of an electrical field device.

Finally, FIG. 4 shows another exemplary embodiment of an electrical field device. As shown in FIG. 4, an electrical field device 40 comprises two modules, namely a housing module 40*a*, which contains the control device 21, the first memory controller 23 and the internal power supply 25, and an operator control unit 40*b*, which comprises the data memory 22 inside the field device, the second memory controller 27, the data interface 24, the monitoring device 32 and the changeover apparatus 31. The housing module 40*a* may be a field device basic module, for example, in which the essential functions of the electrical field device are performed. For this, the housing module 40*a* contains the control device 21. By way of example, the operator control unit 40*b* may be an operator control unit of the kind which can be fitted onto and removed from the housing module 40*a*.

Such a design is particularly suitable when such a field device 40 is installed in a switchgear cabinet. Since the operator control elements of the electrical field device 40 are also meant to be accessible from the outer side of the switchgear cabinet door, it would usually be necessary to install the complete field device in the switchgear cabinet door. With a field device of modular design, however, only the operator control unit 40*b* of the electrical field device 40 needs to be installed in the switchgear cabinet door, while the field device basic module or the housing module 40*a* is arranged inside the switchgear cabinet and is connected to the operator control module 40*b* by means of appropriate data lines.

So that it is possible to read from and write to the data memory inside the field device in a field device of modular design even when the basic device is not operational or when the basic device and the operator control module are not connected to one another, the operator control unit 40*b* contains the data memory 22 inside the field device, the second memory controller 27, the data interface 24 and also the changeover apparatus 31 and the monitoring apparatus 32. As already described in relation to FIG. 3, the data memory 22 can be accessed via the data interface 24. The device modules 40*a* and 40*b* need to have electrical lines provided between them in order to make at least the connections indicated in FIG. 4 between the housing module 40*a* and the operator control unit 40*b*.

The invention claimed is:

1. A method for setting up a data link between a data interface in an electrical field device and a data memory inside the field device, which comprises the following steps:
    monitoring, with a monitoring device, a functionality of a control device and/or of an internal power supply in the electrical field device; and
    if the control device and/or the internal power supply fails, prompting, with the monitoring device, the data link between the control device and the data memory inside the field device to be broken and a data link between the data interface and the data memory inside the field device to be set up; wherein:
    said data memory inside the field device and said data interface are connected by way of a power supply line,
    a first memory controller connects said data memory inside the field device to said control device, and
    a second memory controller connects said data interface with said data memory inside the field device.

2. The method according to claim 1, wherein the prompting step comprises using a changeover switch to break the data link between the control device and the data memory inside the field device and to set up the data link between the data interface and the data memory inside the field device.

3. An electrical field device, comprising:
    a microprocessor-controlled control device;
    an internal data memory and a first memory controller connecting said data memory to said control device;
    a data interface connected to said control device and configured for connecting external equipment to the electrical field device;
    a second memory controller connecting said data interface with said internal data memory inside the field device;

a changeover apparatus having an input connected to said data interface and an output connected to said control device and to said second memory controller;

a field device-internal power supply; and a monitoring device configured to monitor at least one of said power supply and/or said control device for functionality and, if said power supply and/or said control device fails, to prompt said changeover apparatus to break a data link between said data interface and said control device and to set up a data link between said data interface and said second memory controller, wherein said internal data memory and said data interface are connected by way of a power supply line.

4. The electrical field device according to claim 3, which comprises a removable operator control unit comprising at least said internal data memory, said data interface, and said second memory controller.

* * * * *